(No Model.)  4 Sheets—Sheet 1.

H. A. & W. TRIPP.
APPLE PARER.

No. 440,338.  Patented Nov. 11, 1890.

Witnesses:
William Ollis.
E. G. Crannell.

Inventors:
Henry A. Tripp and
Walter Tripp,
By Geo. B. Selden,
Atty.

(No Model.) 4 Sheets—Sheet 2.
H. A. & W. TRIPP.
APPLE PARER.
No. 440,338. Patented Nov. 11, 1890.
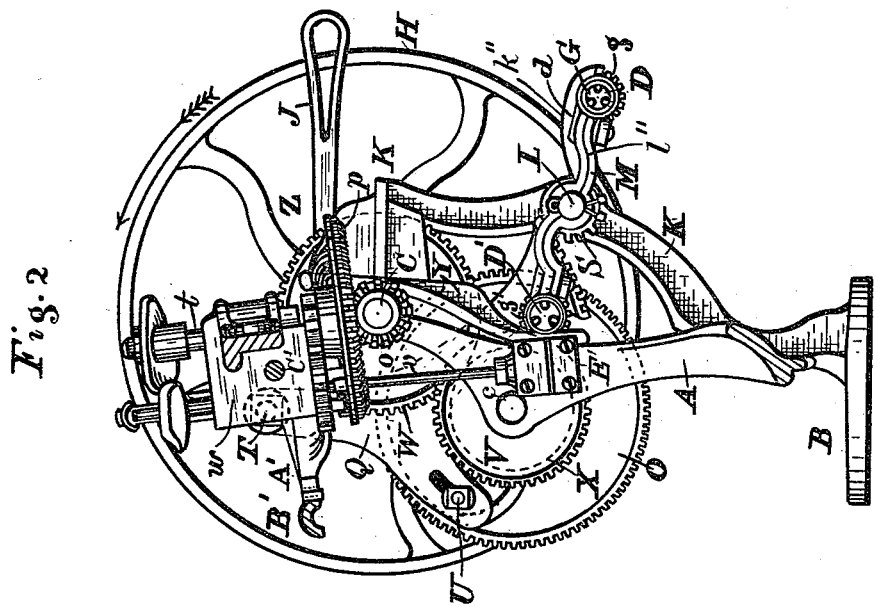
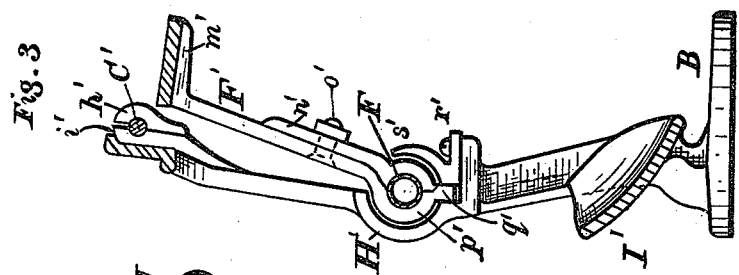
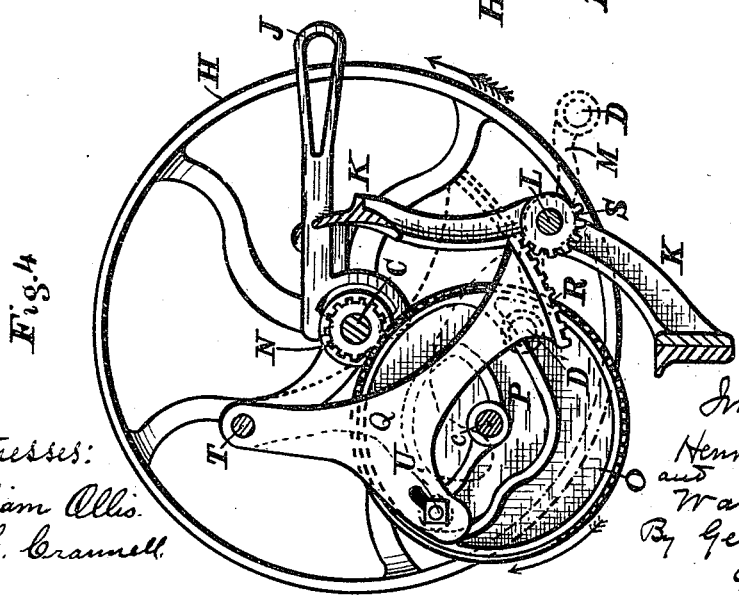
Witnesses:
William Ollis.
C. G. Crannell.
Inventors:
Henry A. Tripp
and
Walter Tripp.
By Geo. B. Selden,
atty.

(No Model.) 4 Sheets—Sheet 3.
H. A. & W. TRIPP.
APPLE PARER.
No. 440,338. Patented Nov. 11, 1890.
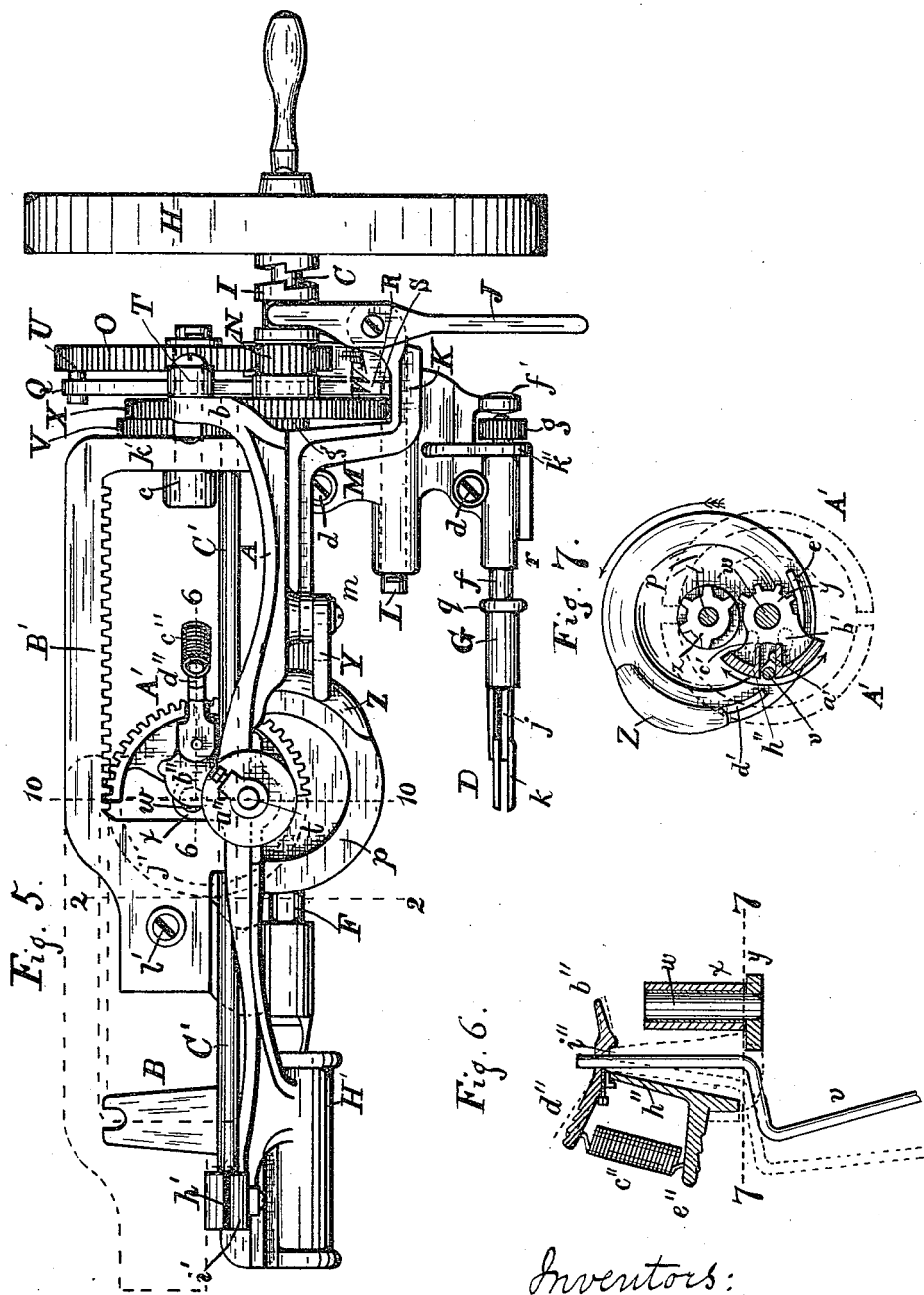
Witnesses:
C. G. Crannell
William Ollis
Inventors:
Henry A. Tripp and
Walter Tripp,
By Geo. B. Selden,
atty.

(No Model.) 4 Sheets—Sheet 4.

H. A. & W. TRIPP.
APPLE PARER.

No. 440,338. Patented Nov. 11, 1890.

Witnesses:
William Ollis.
C. G. Crannell.

Inventors:
Henry A. Tripp and
Walter Tripp.
By Geo. B. Selden.
atty.

UNITED STATES PATENT OFFICE.

HENRY A. TRIPP AND WALTER TRIPP, OF SODUS, NEW YORK.

APPLE-PARER.

SPECIFICATION forming part of Letters Patent No. 440,338, dated November 11, 1890.

Application filed June 5, 1890. Serial No. 354,336. (No model.)

*To all whom it may concern:*

Be it known that we, HENRY A. TRIPP and WALTER TRIPP, citizens of the United States, residing at Sodus, in the county of Wayne, in the State of New York, have jointly invented certain Improvements in Apple-Parers, of which the following is a specification, reference being had to the accompanying drawings.

Our invention relates to certain improvements in apple-parers, which improvements are fully described and illustrated in the following specification and accompanying drawings, and the novel features thereof specified in the claims annexed to the said specification.

Our improvements in apple-parers are represented in the accompanying drawings, in which—

Figure 1:
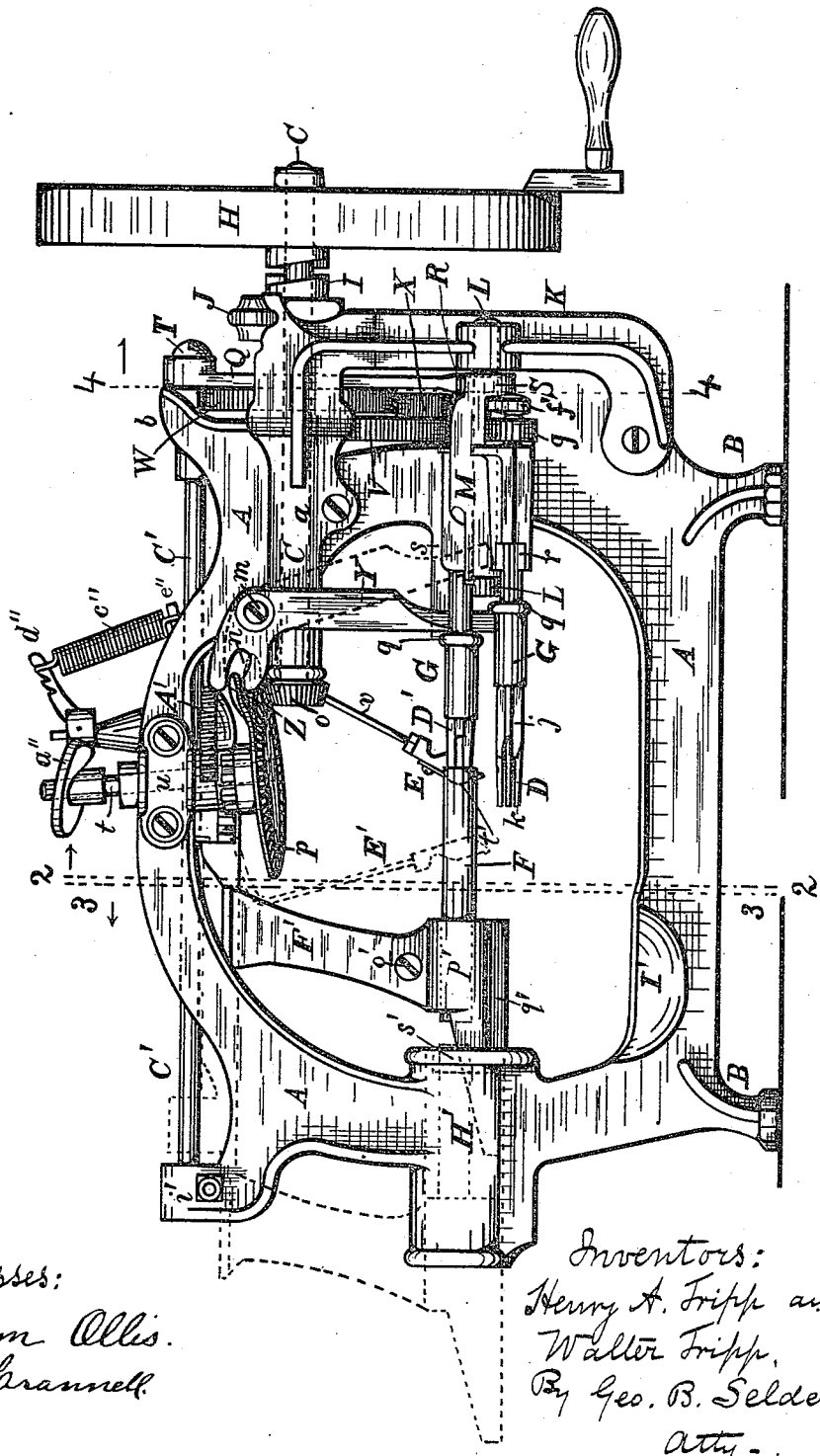
Figure 9:
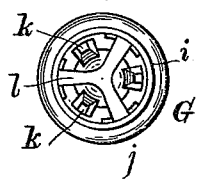
Figure 8:
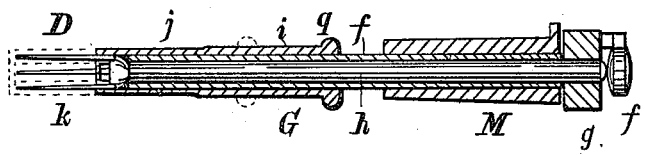
Figure 10:
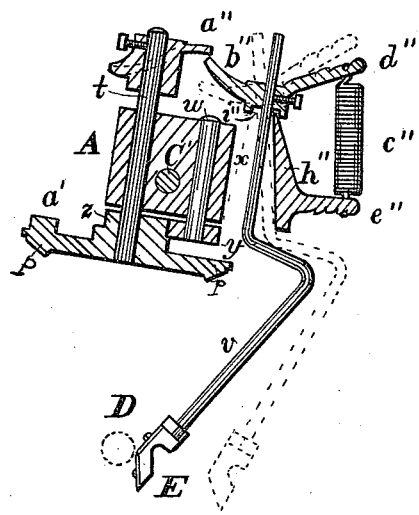
Figure 11:
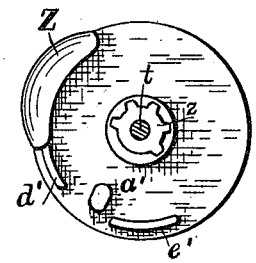
Figure 12:
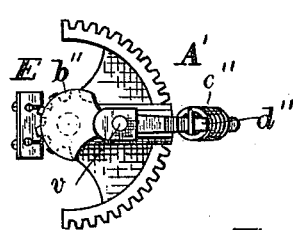
Figure 13:
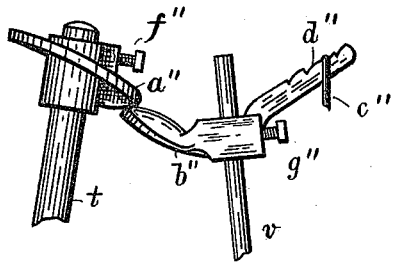
Figure 14:
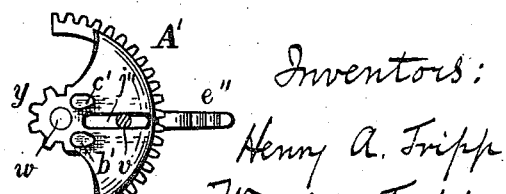

Figure 1 is a front elevation. Fig. 2 is a vertical section on the line 2 2, Fig. 1, showing the parts to the right hand of said line. Fig. 3 is a vertical section on the line 3 3, Fig. 1. Fig. 4 is a vertical section on the line 4 4, Fig. 1. Fig. 5 is a plan view. Fig. 6 is a section on the line 6 6, Fig. 5. Fig. 7 is a section on the line 7 7, Fig. 6, showing the parts below that line. Fig. 8 is a longitudinal section of the fork and doffer. Fig. 9 is an end view of the fork and doffer. Fig. 10 is a transverse section on the line 10 10, Fig. 5, showing the parts in the position they occupy when the knife is directly behind the apple. Fig. 11 is a plan view of the bevel-gear detached, showing the cam which operates the doffer-lever and the mutilated pinion, cam, and ribs which actuate the knife and the corer. Fig. 12 is a plan view of the oscillating arm which carries the knife-rod, showing also the oscillating segmental rack which operates the corer. Fig. 13 is a side elevation of the cams which hold the knife away from the fork during its return movement. Fig. 14 is an inverted view of the segmental pinion and segmental rack.

Our invention relates to improvements in that type of apple-parers in which two forks are used, one of which remains stationary to permit an apple to be placed thereon while another apple on the other fork is being pared.

The general construction and arrangement of the machine will be understood from an examination of the front elevation, Fig. 1.

The frame A is provided with the feet B, and sustains the operative parts of the machine, which consists, essentially, of the main driving shaft C, the forks D D', the paring-knife E, the corer F, and doffer G, and suitable connecting mechanism, whereby motion is transmitted from the driving-shaft at the proper times to these various parts.

As indicated in the drawings, the frame presents in its configuration a central opening within which the paring and coring is performed, the arrangement being such that an apple placed on the fork next the operator is by it carried to the point where it is subjected to the operation of the knife, and after being cored is discharged in the rear of the machine on the side away from the operator. The frame is constructed so as to afford support to the driving-shaft and the rotary fork-frame on one side of the central opening, (preferably the right-hand side,) for the reciprocating corer on the opposite side, and for the revolving mechanism which operates the knife and the doffer above the said opening. The machine is arranged to be operated either by hand or other power. When driven by power, a belt is applied to the wheel H, which runs loose on the shaft C, a clutch I, operated by the lever J, being provided, by which the wheel is connected with or disengaged from the shaft for the purposes of starting and stopping the machine. The wheel may be fastened on the shaft and provided with a handle when it is desired to operate the machine by hand.

The shaft C revolves in a divided pipe-box, the rear half of which is formed in the frame itself, and the front half $a$ of which is cast with the frame K, which extends outward and downward and sustains the stud L, on which the yoke M, carrying the forks, makes a half-revolution first in one direction and then in the other.

The manner of operating the forks will be readily understood from an examination of Fig. 4, which is a sectional view on the line 4 4, Fig. 1, looking toward the right hand. A pinion N on the shaft C drives the gear O, which is provided with a cam P, which imparts a swinging motion to the lever Q, which carries the segmental rack R, meshing with the segmental pinion S on the yoke carrying the forks. The lever is pivoted at T to a suitable extension on the frame. The oscillating movement of the lever Q is indicated by the full and dotted lines in Fig. 4. A stud U, secured by a nut in a slot in the lever, travels in the cam-groove P and imparts the oscillating motion to the lever. The cam-groove is so shaped as to cause the yoke and the forks to remain stationary during nearly one half-revolution of the cam P on lever O, and it is during the pause or interval between the alternating movements of the forks that an apple on the inner fork is pared, while the operator places another apple on the outer fork. The pivot T of the lever Q is inserted in a suitable extension of the frame b, Fig. 5. The gear O is carried by a stud c, inserted in the frame.

The yoke M is formed in two halves, as indicated in Fig. 2, the parts being secured together by the screws or bolts d, Fig. 5. The boxes for the stud L, and for the sleeves f, in which the spindles of the forks revolve, are formed in the upper and lower parts of the yoke. This construction facilitates the manufacture by avoiding drilling. The sleeves f are preferably made of brass tubing. At their outer ends the spindles of the forks are provided with the pinions g g', which when the forks are moved inward engage with the teeth of the gear V, which is driven from the shaft C by the gear W and the pinion X, which may be cast integrally with the gear V. The pinion and gear revolve together on the stud c. The arrangement is such that whenever one of the forks occupies the inner position, as represented at D', Fig. 2, its pinion meshes with the gear V, and the fork is rotated thereby for the purpose of paring the apple on the fork. The lever Q remains stationary during the operation of paring the apples, the stud U at this time traveling through the concentric portions of the groove P. The stud U is made adjustable in a slot in the lever by means of a nut, so that the position of the forks may be adjusted in proper relation with the paring-knife E and the corer F.

The construction of the doffer, the fork, and the supporting-sleeve will be understood from an examination of Fig. 8, which is a longitudinal section.

The spindle h revolves in the sleeve f, which is clamped between the upper and lower parts of the yoke M. An arm f' on the yoke M supports the end of the spindle h, the contact-surfaces being made convex or pointed, so as to reduce the friction.

The doffer G consists of a collar i, arranged to slide on the sleeve f, and provided with arms j, which slide between the tines k of the fork and serve to force the core off the fork when the apple is pared and cut. The arms j are connected together between the tines k by the bars l, as represented in the end view, Fig. 9. The mechanism for sliding the doffer lengthwise of the fork consists of the lever Y, operated by the revolving cam Z, the return movement of the doffer being effected by the operative by placing an apple on the outside fork. The lever Y is pivoted to the frame at m, and at its upper end it is provided with a slot n, which engages with the curved lip constituting the cam Z on the bevel-gear p, which is driven from the main shaft C by the bevel-pinion o. The motion of the lever Y is indicated by the full and dotted lines in Fig. 1. The lower end of the lever reaches downward in rear of the shafts of the forks and comes in contact with the end of the doffer, which may be provided with an enlarged collar, as represented at q. The yoke M is cut away, as represented at r, to permit the swinging movement of the lower end of the lever Y. Behind the lever Y a projecting arm s on the frame serves to support its lower end during its vibrating movement. The bevel-gear p is carried by spindle t, passing through a suitable box u on the frame. The spindle t may be arranged to revolve in a sleeve in the box. This gear p, besides operating the doffer-lever Y, serves also to give motion to the paring-knife and the corer. The paring-knife is carried by a stem v, which swings on the axis w, Figs. 5, 6, and 7, so as to carry the knife around the apple. The position occupied by the knife at the end of the paring operation is indicated at E in Fig. 1, while its position during the shifting movements of the forks is represented at E'. The shaft w passes through a suitable lug x on the frame, and it is provided at its lower end with a segmental gear y, Figs. 6, 7, and 10, which meshes with a segmental pinion z on the gear p, and from which it receives motion of a half-revolution in one direction, the return movement being secured by the cam a' on the gear p coming in contact with the projecting lug b' on the lower side of the segmental gear y. A supplemental lug c' on the gear y comes in contact with the front end of the rib d', and a rib e' on the gear p prevents any irregularity in the movement of the shaft w. It will be understood that, through the segmental pinion z and segmental gear y and the projections a' b' c' d', the gear p, while making a continuous revolution, causes the shaft w and its attached parts to make a half revolution or oscillation first in one direction and then in the other, as indicated by the double-headed arrow and the full and dotted lines in Fig. 7. The shaft w carries the segmental gear A', which meshes with the rack B' and transmits a reciprocating motion to the corer. The rack B' slides lengthwise of the machine, being guided on a rod C', which is inserted in the frame at b, Fig. 5, and at the other end is secured by a suitable clamp h' to a projecting arm i'. The rod C' extends through the lug on the frame which carries the shaft w, as indicated in the sectional view, Fig. 2, and between the shaft $w$ and the spindle $t$. The rack B' is supported by the arms $j'$ $k'$ which are provided with journals adapted to slide on the guide-rod C'. The movement of the rack B' on the guide-rod is represented by the full and dotted lines in Fig. 5. The corer F is connected with the reciprocating rack B' by the arm F', the arm being provided at its upper end with the projecting lug $m'$, Fig. 3, which is secured to the arm $j'$ of the rack by the screw $l'$, Fig. 5. At its lower end the arm F' is formed into a suitable half-socket $p'$, Fig. 3, which receives the corer-tube F, which is secured therein by the clamp $n'$ and screw $o'$. The half-socket $p'$ also forms a guide $q'$ for the lower end of the arm and the corer, this guide being arranged to slide in a suitable way formed in the frame. The rear side of this way is made by the gib $r'$, Fig. 3, secured to the frame by screws or bolts. The frame has a suitable recess H', within which the corer and the lower end of the arm F' slide. The movement of the corer is so timed that it has completed its forward movement toward the fork just as the knife completes the paring of the apple, and on its return it carries the pared and cored apple with it, the apple being forced off the corer by the socket H', so that it drops down and is guided by the inclined chute I' on the frame into a suitable receptacle at the rear of the machine. The cores are discharged through the corer, the gib $r'$ having an upwardly-projecting curved arm $s'$, Figs. 1 and 3, which assists the socket H' in stripping the apples from the corer; but the cores as they pass from the corer fall downward over the outer end of the gib $r'$ into a suitable receptacle. The corer is formed of a tube of suitable dimensions, preferably of a metal which is not corroded by the acid juices of the fruit. The front end of the corer is preferably beveled on the rear side, as indicated by the dotted lines $t'$, Fig. 1, so as not to interfere with the paring-knife. The corer is readily detached from the arm F', or its position relative to the fork adjusted, by means of the clamp $n'$ and screw $o'$.

In order to provide for holding the paring-knife away from the fork during its return movement, we employ the cam $a''$ on the upper end of the revolving shaft $t$, arranged to act upon the cam $b''$ on the upper end of the knife-stem $v$. A spring $c''$, attached at one end to the arm $d''$ on the cam $b''$ and at the other end to the arm $e''$, which oscillates with the segmental pinion $y$, serves to hold the paring-knife against the apple during the paring operation. The arms $d''$ and $e''$ are provided with a series of notches, so that the tension of the spring $c''$ may be regulated by engaging the loops at its ends in the various notches. The cam $a''$ is attached to the upper end of the shaft $t$ by the set-screw $f''$, Fig. 13, so that its position can be adjusted to vary the movement of the paring-knife relatively to the apple. The cam $b''$ is attached to the upper end of the knife-stem $v$ by the set-screw $g''$, Fig. 13.

The segmental pinion $y$ is provided with a projecting arm $h''$, which is slotted to permit the movement of the knife-stem $v$.

The upper end of the arm $h''$ is made of reduced dimensions, so that it can fit the socket $i''$, Figs. 6 and 10, in the lower side of the arm $b''$. The spring $c''$ holds the socket $i''$ down on the upper end of the arm $h''$, while at the same time permitting the swinging of the knife-stem $v$. The slot $j''$, in which the knife-stem $v$ swings, is represented in the inverted view, Fig. 14, of the segmental pinion $y$ and the segmental rack A', which figure also shows the cams $b'$ and $c'$, which effect the return movement of the paring-knife and corer. The cam $a''$ consists of a circular flange arranged spirally about the shaft $t$ and adapted by the contact of its lower surface with the cam $b''$ to give the requisite swinging movement to the knife-stem, as indicated by the full and dotted lines in Fig. 10. The paring-knife is of any ordinary or preferred construction, and it is attached to the lower end of the knife-stem in any suitable manner.

The yoke M is provided with a stiffening-rib $k''$. The shaft L is inserted in a suitable boss in the upright portion of the arm K. The yoke revolves freely on the shaft L, its movements by which the forks are interchanged being controlled entirely by the lever Q and rack R. The line of division between the upper and lower portions of the yoke M is indicated by the line $l''$, Fig. 2. It will be observed that the construction of the mechanism for operating the coring device imparts to the corer a slow forward and a quick return movement.

The arm $f'$, which receives the end thrust of the fork-shaft, is cast with either the upper or lower portion of the yoke M.

We claim—

1. The combination, with the supporting-frame and main shaft C, of the interchanging forks D D', the oscillating yoke M, provided with pinion S, the pivoted lever Q, having stud U and curved rack R, meshing with the pinion on the yoke, the vibrating lever Q, and the revolving cam P, provided with a cam-groove having two concentric portions, whereby a vibrating movement is imparted to the lever and the forks are caused to interchange positions by the oscillation of the yoke first in one direction and then in the other, substantially as described.

2. The combination, with the forks D D' and supporting-shaft L, of the divided yoke M, substantially as described.

3. The combination, with the supporting-frame and main shaft C, of the interchanging forks D D', the oscillating yoke M, provided with pinion S, the pivoted lever Q, having stud U and curved rack R, meshing with the pinion on the yoke, the vibrating lever Q, the revolving cam P, provided with a cam-groove having two concentric portions, the gears W, V, X, and O, and the pinion C, substantially as described.

4. The combination, with the rotating fork of an apple-parer, of the paring mechanism consisting of the continuously-revolving gear $p$ and shaft $t$, carrying cam $a''$, the pivoted oscillating knife-stem $v$, provided with cam $b''$, the segmental gears $y$ and $z$, and cams $a' b'$, whereby an oscillating movement is imparted to the knife-stem from the continuously-revolving gear, substantially as described.

5. The combination, with the oscillating segmental pinion $y$, carrying the slotted arm $h''$, of the knife-stem $v$, knife E, cam $b''$, having socket $i''$, and spring $c''$, substantially as described.

6. The combination, with the supporting-frame, of the rotating fork and suitable paring mechanism, the reciprocating coring-tube F, arm F', provided with clamp $n'$ and screw $o'$, whereby the position of the coring-tube relatively to the fork is adjusted, rack B', and oscillating segment A', substantially as described.

7. The combination, with the supporting-frame, of the rotating fork and suitable paring mechanism, the reciprocating coring-tube F, arm F', provided with clamp $n'$ and screw $o'$, and the socket H', having gib $s'$, substantially as described.

8. The combination, with the supporting-frame provided with the inclined chute I', of the fork D, carrying the sliding doffer G, and the reciprocating corer F, arranged to discharge the cored apple down the chute on its return movement by bringing it in contact with the frame, substantially as described.

9. The combination, with the supporting-frame and the main shaft C, provided with bevel-pinion $o$, of the bevel-gear $p$, having cam Z, the fork D', the sliding tubular doffer G, and the angular doffer-lever Y, substantially as described.

10. The combination, with the supporting-frame and the main shaft C, provided with beveled pinion $o$, of the bevel-gear $p$, having cam Z, the interchanging forks D D', carrying sliding tubular doffers G G, the oscillating yoke M, suitable mechanism adapted to drive the forks when in operative position and to impart an oscillating movement first in one direction and then in the other to the yoke, and the pivoted doffer-lever Y, arranged to move the doffers in succession, substantially as described.

11. The combination, with the forks D D', doffers G G, shafts $h\ h$, and sleeves $f\ f$, of the divided yoke M, substantially as described.

12. The combination, with the forks D D', doffers G G, shafts $h\ h$, and sleeves $f\ f$, of the divided yoke M and the arms $f''$, substantially as described.

13. The combination, with the revolving gear $p$, provided with cam $a'$, ribs $d'\ e'$, and segmental pinion $z$, of the segmental pinion $y$, provided with cams $b'\ c'$ and having the knife-stem $v$ pivotally secured thereto, substantially as described.

HENRY A. TRIPP.
     WALTER TRIPP.

Witnesses:
 CHARLES L. BROWN,
 J. J. SEYMOUR.